US012795555B2

(12) United States Patent
Ballantyne et al.

(10) Patent No.: US 12,795,555 B2
(45) Date of Patent: Nov. 10, 2026

(54) METHODS AND DEVICES OF DATA BLOCK ALLOCATION FOR REDUCED POWER CONSUMPTION IN POWER AMPLIFIERS

(71) Applicant: Intel Corporation, Santa Clara, CA (US)

(72) Inventors: Wayne Ballantyne, Chandler, AZ (US); Chuanzhao Yu, Phoenix, AZ (US); Ali Azam, Hillsboro, OR (US); Gregory Chance, Chandler, AZ (US); Lichung Tony Chang, Mesa, AZ (US)

(73) Assignee: INTEL PRODUCTS IP LLC, Santa Clara, CA (US)

(*) Notice: Subject to any disclaimer, the term of this patent is extended or adjusted under 35 U.S.C. 154(b) by 380 days.

(21) Appl. No.: 18/548,914

(22) PCT Filed: Jun. 25, 2021

(86) PCT No.: PCT/US2021/039017
§ 371 (c)(1),
(2) Date: Sep. 4, 2023

(87) PCT Pub. No.: WO2022/271179
PCT Pub. Date: Dec. 29, 2022

(65) Prior Publication Data

US 2024/0172131 A1 May 23, 2024

(51) Int. Cl.
*H04W 52/34* (2009.01)
*H04L 5/00* (2006.01)
(Continued)

(52) U.S. Cl.
CPC ........... *H04W 52/34* (2013.01); *H04L 5/0048* (2013.01); *H04W 72/0473* (2013.01); *H04W 72/1273* (2013.01)

(58) Field of Classification Search
CPC ............. H04W 52/34; H04W 72/0473; H04W 72/1273; H04L 5/0048
See application file for complete search history.

(56) References Cited

U.S. PATENT DOCUMENTS

| | | | | |
|---|---|---|---|---|
| 2012/0044845 A1 | | 2/2012 | Lee et al. | |
| 2012/0064849 A1* | | 3/2012 | Langer ..................... | H04B 1/04 455/127.2 |

(Continued)

FOREIGN PATENT DOCUMENTS

| | | | |
|---|---|---|---|
| JP | 2012129638 A * | 7/2012 | |
| KR | 20160035975 A | 4/2016 | |
| WO | 2016111541 A1 | 7/2016 | |

OTHER PUBLICATIONS

Fatima Zohra Kaddour et al., Power Control in Opportunistic and Efficient Resource Block Allocation Algorithms for Green LTE Uplink Networks, 2013 IEEE Online Conference on Green Communications (OnlineGreenComm), IEEE, Oct. 29, 2013, pp. 8-13.

(Continued)

*Primary Examiner* — Samina F Choudhry
(74) *Attorney, Agent, or Firm* — VIERING, JENTSCHURA & PARTNER mbB

(57) ABSTRACT

Methods and devices configured to determine, for a slot including a plurality of symbols allocated for downlink data, a downlink data block allocation scheme with a number of blocks of downlink data that remain constant or monotonically decrease starting at a designated symbol of the plurality of symbols allocated for downlink data; generate a voltage profile corresponding to the downlink data block allocation scheme, where the voltage profile includes a plurality of bias voltages; and apply a bias voltage selected from the plurality of bias voltages to a power amplifier in a transmission chain of the base station.

18 Claims, 11 Drawing Sheets

Power saving with use of APT and ET compared to fixed voltage

(51) Int. Cl.
*H04W 72/044* (2023.01)
*H04W 72/1273* (2023.01)

(56) References Cited

U.S. PATENT DOCUMENTS

| | | | | |
|---|---|---|---|---|
| 2014/0341318 | A1 | 11/2014 | Pourkhaatoun et al. | |
| 2016/0360550 | A1* | 12/2016 | Chen | H04L 5/0005 |
| 2020/0336122 | A1* | 10/2020 | Lin | H03G 3/3042 |
| 2022/0085940 | A1* | 3/2022 | Xiong | H04W 72/0453 |

OTHER PUBLICATIONS

International search report issued for the corresponding international patent application No. PCT/US2021/039017, dated Mar. 16, 2022, 3 pages (for informational purposes only).

* cited by examiner

Power saving with use of APT and ET compared to fixed voltage

600

METHODS AND DEVICES OF DATA BLOCK ALLOCATION FOR REDUCED POWER CONSUMPTION IN POWER AMPLIFIERS

CROSS-REFERENCE TO RELATED APPLICATIONS

This is a national phase of PCT Application PCT/US2021/039017, which was filed on Jun. 25, 2021, the entire contents of which are incorporated by reference herein.

TECHNICAL FIELD

Various aspects relate generally to wireless communications including allocation of data blocks for reduced power amplifier power consumption.

BACKGROUND

Dynamically changing the supply voltage to a power amplifier (PA) is utilized in radio frequency (RF) communications to improve PA efficiency. In Long-Term Evolution (LTE) or other radio access technologies (RATs), both average power tracking (APT) and envelope tracking (ET) methods may be employed. In LTE, for example, the benefits of ET and APT are significant for devices such as user equipment (UE), where the transmit power control leads to an average power dynamic range over 30 dBs, and where the Peak/Average ratio for orthogonal frequency division multiplexing (OFDM) waveforms is 7-8 dB.

For the Third Generation Partnership Project (3GPP) New radio (NR) Fifth Generation (5G) standard, the use of conventional APT and ET schemes is much more challenging due to the wider channel bandwidths and shorter slot times. The present disclosure provides devices and methods that improve power efficiency and reduce power consumption of PAs via the application of bias voltages that take advantage of the data block allocation schemes (i.e., resource block profiles) described herein.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

The following description refers to the accompanying drawings that show, by way of illustration, specific details and aspects in which the disclosure may be practiced.

Figure 1:
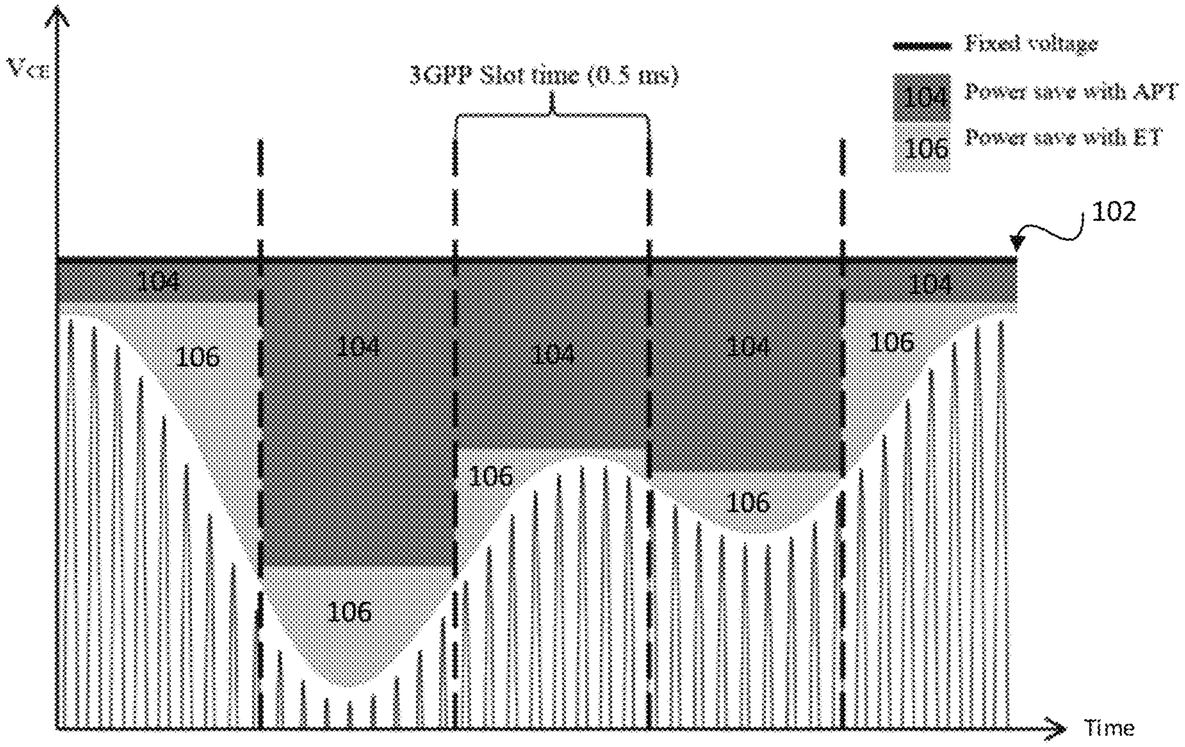
FIG. 1 exemplarily shows a graph illustrating power savings of APT and ET in accordance with various aspects, FIG. 2 exemplarily shows a downlink data block allocation diagram in accordance with various aspects.

FIG. 1 is a graph illustrating power saving for APT and ET compared with a fixed voltage. It is appreciated that, like other Figures of this disclosure, FIG. 1 is exemplary in nature and may thus be simplified for purposes of this explanation.

As shown in FIG. 1, APT provides power saving shown by the regions marked 104 compared with that of a fixed voltage (fixed voltage shown by line 102) since the applied voltage is determined on a slot basis based on a maximum power level required in each slot. ET provides even further power saving compared to APT as the applied voltage is determined based on the detected envelope of the signal waveform. The power savings of ET with respect to APT are shown in the regions marked 106. The power savings of ET compared with the fixed voltage 102 can therefore be described as the total area shown by both 104 and 106.

For the Third Generation Partnership Project (3GPP) New radio (NR) Fifth Generation (5G) standard, the use of APT and ET is much more challenging due to the wider channel bandwidths and shorter slot times. For example, in frequency range 2 (FR2) including operational frequencies in the mmWave region above 24 GHz, the slot times can 125 μs with symbol times equal to 125/14=8.9 μs (including cyclic prefix, CP) for 120 kHz subcarrier spacing (SCS). Furthermore, in the 52-71 GHz range, larger SCSs have been proposed, which lead to even shorter slot times. Table 1 below provides some values illustrating the numerologies for this higher frequency range.

TABLE 1

| μ | 4 | 5 | 6 | 7 |
|---|---|---|---|---|
| Subcarrier spacing | 240 kHz | 480 kHz | 960 kHz | 1.92 MHz |
| Symbol duration | 4.17 μs | 2.08 μs | 1.04 μs | 0.52 μs |
| Slot duration | 62.43 μs | 31.22 μs | 15.60 μs | 7.80 μs |
| Normal CP length | 292.97 ns | 146.48 ns | 73.24 ns | 36.62 ns |

As shown in Table 1, for example, the symbol time may be as short as approximately 1 μs for 960 kHz SCS.

For NR base stations (also commonly referred to as gNodeBs or gNBs) there is even more power saving opportunity with slot-based or symbol-based APT given that the output levels are higher than those for a UE (e.g., 27-30 dBm for a gNB). However, the number of downlink (DL)

resource blocks (RBs) or control resource sets (CORESETs) allocated per symbol may vary based on the overall user traffic and the scheduler-specific allocations.

Figure 2:
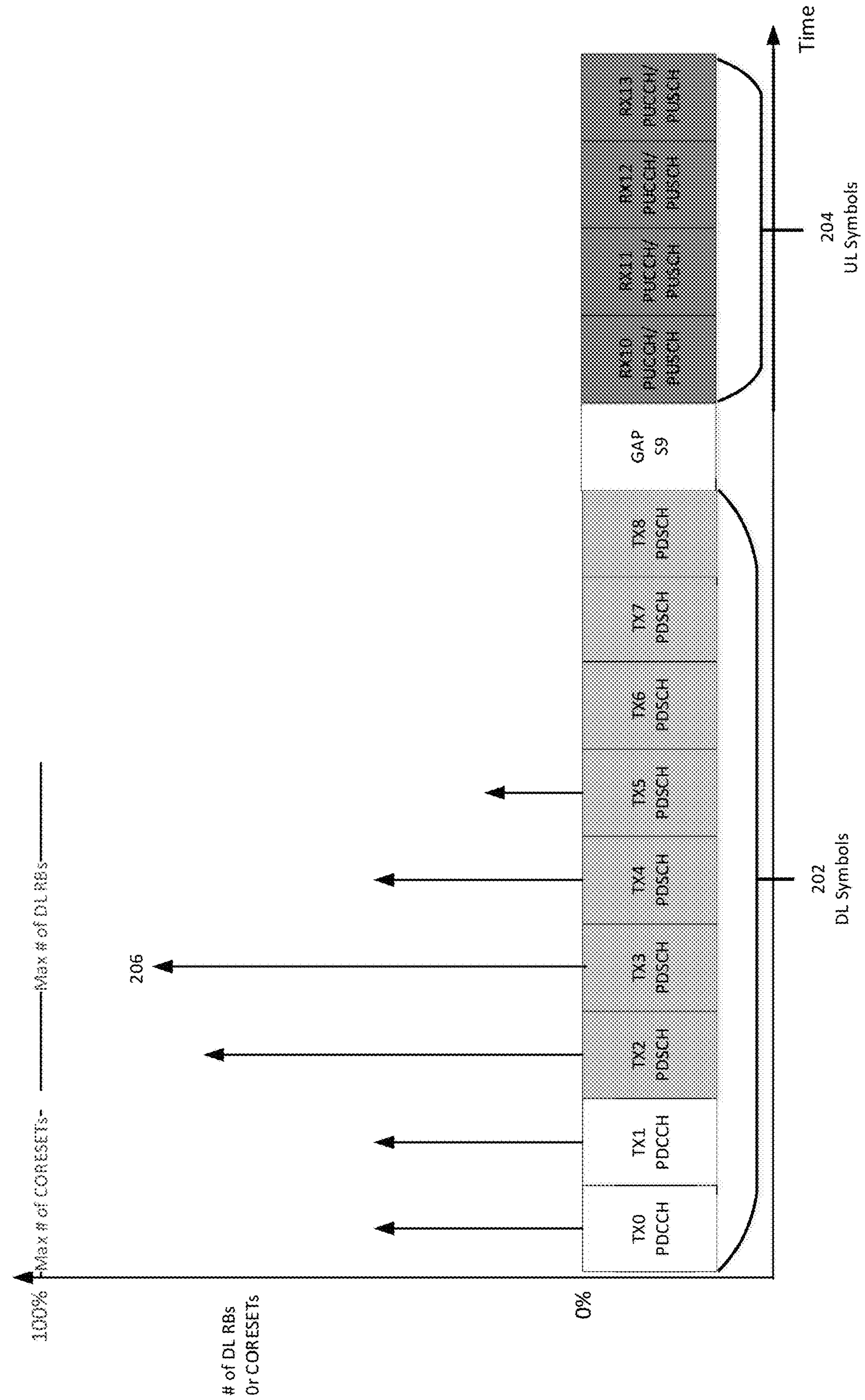

FIG. 2 illustrates an example of a base station RB allocation diagram in a medium loading scenario for a given slot including 14 symbols. The diagram shows an example of a possible time division duplex (TDD) for DL and uplink (UL) symbol allocation in a slot. It is appreciated that the symbol allocation depicted in FIG. 2 is exemplary in nature and other symbol allocations may be implemented according to the slot number and/or other 3GPP or radio access technology (RAT) considerations.

In FIG. 2, the first 9 symbols are allocated for DL data (marked as DL symbols 202). The first two symbols (i.e., TX0 and TX1) are allocated for DL control data in the form of a Physical Downlink Control Channel (PDCCH) which may carry downlink control information (DCI) and/or CORESETs. The next 7 symbols (i.e., shaded symbols TX2 to TX8) are allocated to DL user data in the Physical Downlink Shared Channel (PDSCH) which may carry downlink user data in the form of DL RBs. The tenth symbol (i.e., Symbol 9 or S9) is left blank to provide a gap between the DL symbols and the UL symbols. The remaining symbols in the slot are allocated for UL (marked as UL symbols 204) in the form of Physical Uplink Control Channel (PUCCH) or Physical Uplink Shared Channel (PUSCH).

The actual PA output power may vary based on (a) the number of CORESETs or broadcast messages sent during the symbols allocated to PDCCH for each slot (in FIG. 2, there are two symbols allocated for PDCCH, but it is appreciated that other quantities of symbols may be allocated for PDCCH, e.g., one or three symbols), or (b) the number of DL RBs sent during the symbols allocated for PDSCH. Furthermore, NR introduced new features that make the RB pattern less predictable: (1) mini-slots allowing for a UE allocation of two, four, or seven symbols, and (2) common reference symbols are not required in NE, so during periods with lower user traffic, DL symbols can be omitted if the user payload can be fit into earlier symbols.

The y-axis in FIG. 2 corresponds to the number of CORESETs or DL RBs allocated in each symbol, with the values ranging from 0% to 100%, with 100% being the maximum number of CORESETs or DL RBs that may be transmitted per symbol. The arrows pointing up from each of the first 6 symbols (i.e., symbols TX0 to TX5) illustrate the quantity of CORESETs or DL RBs allocated in each of the symbols over the scale of 0% to 100%. The x-axis corresponds to the time domain, where each of the symbols in the slots have a duration based on the SCS. It is appreciated that, like other figures in this disclosure, FIG. 2 is exemplary in nature and thus other variations are included in this disclosure, e.g., a higher loading scenario with greater numbers of CORSETs or DL RBs in the indicated symbols or DL RBs provided in symbols TX6-TX8.

A slot-based APT would set the PA voltage level (or other PA parameter) to the level corresponding to the power needed to transmit the DL RBs in the fourth symbol (i.e., TX3) 206 since this symbol has the maximum number of DL RBs (or CORESETs) of the DL symbols. It is appreciated that one of the other symbols allocated for DL user data may have the highest quantity of DL RBs, or one of the symbols allocated for DL control data (i.e., PDCCH) may have the highest quantity of CORESETs (i.e., higher than the DL RBs allocated for PDSCH). Setting the slot-based APT to the power needed by the fourth symbol would give an improvement over a fixed PA voltage bias at the maximum level, but it omits considerable power saving opportunities for the other symbols that have lower DL RB or CORESET allocations.

The present disclosure considers several aspects for implementing a more complex and elegant power-efficient solution for applying bias voltages to the PA. First, to account for the shortened slot and symbol times of NR, the PA bias voltage may need to be adjusted on the scale of just a few microseconds (μs). Increasing the bias voltage in real-time is usually much more difficult compared to simply decreasing it. Second, the upper layers of the baseband processor may be configured to pass down detailed information covering the DL RB or CORESET allocations per symbol. This allows for adapting the PA on a precise schedule to occur just as the new symbol commences. If the PA voltage ramps up too late, for example, error vector magnitude (EVM) degradation may occur.

The present disclosure discloses a number of features for applying bias voltages to a PA. The first of these features is the implementation of a per-slot RB profile. This RB profile may also be referred to as a downlink data block allocation scheme where the number of blocks of downlink data (either DL RBs for the PDSCH or CORESETs for the PDCCH, for example) remain constant or monotonically decrease starting at a designated symbol of the plurality of symbols allocated for downlink data in a slot. The second of these features is a compact RB profile descriptor or downlink data descriptor that includes a maximum number of data blocks in the designated symbol and the symbol position for the first DL symbol having the maximum number of blocks of DL data (either CORESETs in the PDCCH or DL RBs in the PDSCH). A third feature includes PA and bias circuits that take advantage of the first two features. A fourth feature includes accompanying circuits that provide a symbol-based power tracking function (SPT) to estimate the number of blocks of DL data (either CORESETs in the PDCCH or DL RBs in the PDSCH) in a symbol. By taking advantage of these features, the present disclosure provides mechanisms to implement a symbol-based APT scheme where the bias voltage applied to a PA tracks the number of blocks of downlink data transmitted in the downlink symbols. This is in part due to the constant or monotonically decreasing number of data blocks allocated in the downlink symbols starting at a designated symbol, which allows the PA bias voltage to remain constant or be reduced across the transmission of downlink symbols in the slot. An exemplary illustration and description of this symbol-based APT scheme is provided in FIG. 3 and its corresponding description.

The present disclosure provides methods and devices that are configured to determine, for a slot including a plurality of symbols allocated for downlink data, a downlink data block allocation scheme with a number of blocks of downlink data that remain constant or monotonically decrease starting at a designated symbol of the plurality of symbols allocated for downlink data; generate a downlink transmission power profile corresponding to the downlink data block allocation scheme, where the downlink transmission power profile includes a plurality of power bias voltages; and apply a power bias voltage selected from the plurality of power bias voltages to a power amplifier in a transmission chain of a base station.

Additionally, the present disclosure provides methods and devices that are configured to determine, for a slot including a plurality of symbols allocated for downlink data, a downlink data block allocation scheme with a number of blocks of downlink data that remain constant or monotonically decrease starting at a designated symbol of the plurality of symbols allocated for downlink user data; and generate a downlink data descriptor including a first field indicating that the downlink data block allocation scheme includes blocks of downlink data that remain constant or monotonically decrease starting at a designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

Advantages of the methods and devices presented herein include, but are not limited to, the following. First, the schemes and devices presented herein achieve a symbol-based APT for FR2 that reduces PA energy per slot by as much as 20%-50% compared with that of a fixed supply. The energy savings may, in part, depend on the RB profiles (i.e., downlink data block allocation schemes) in use, the overall system loading, and the circuit implementation. Second, if the PA bias voltage ramp-down is slightly delayed for each symbol, this may only result in the PA being somewhat less efficient until the voltage settles, but otherwise, there are no other negative side effects. On the other hand, if the RB profile is not flat or monotonically decreasing (i.e., if there are some increases in the DL RBs or CORESETS allocated in the symbols in a slot), and the PA bias voltage ramp-up is delayed, then EVM degradation will occur. Third, the PA bias max voltage may be set based on the compact RB profile descriptor message (i.e., downlink data descriptor), and it will be faster to ramp down the supply voltage than to ramp it up. Fourth, the number of control messages from the baseband can be reduced. Fifth, in some circuit implementations, the bias control modification may be triggered by the transmission (TX) circuitry itself.

Figure 3:
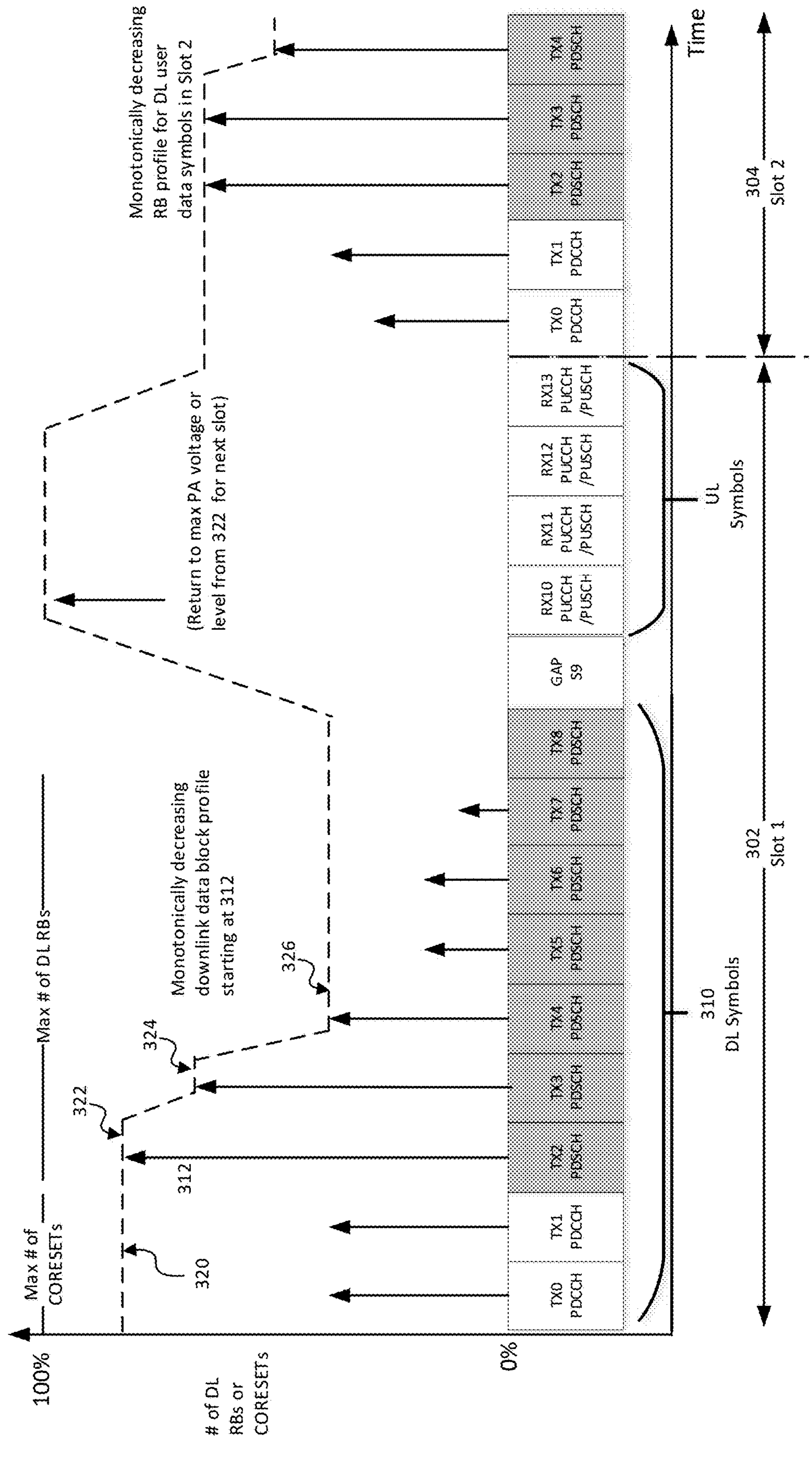
FIG. 3 exemplarily shows a downlink data block allocation diagram with a constant or monotonically decreasing downlink data block allocation scheme per slot in accordance with various aspects.

FIG. 3 illustrates a diagram highlighting several aspects of the present disclosure. Similar to FIG. 2, the y-axis corresponds to the number of DL RBs or CORESETs allocated in each symbol, with the values ranging from 0% to 100%, with 100% being the maximum number of CORESETs or DL RBs that may be transmitted per symbol. The arrows pointing up from each of the symbols illustrate the quantity of CORESETs or DL RBs allocated in each of the symbols over the scale of 0% to 100%. The x-axis corresponds to the time domain, where each of the symbols in the slots have a duration based on the SCS.

In FIG. 3, a downlink data block allocation scheme for Slot 1 302 is shown where, for a plurality of symbols allocated for downlink data 310, a number of the blocks (i.e., either CORESETs or DL RBs) remain constant or monotonically decrease starting at a designated symbol. In this example, the designated symbol is TX2, where the quantity of blocks (DL RBs in this case) is shown by 312, i.e., the highest number blocks of downlink data (either CORESETs or DL RBs) of the plurality of DL symbols 310. In other words, the third symbol of the plurality of DL symbols is the designated symbol at which the number of blocks of downlink data are the highest, and after which, the number of data blocks per symbol of the plurality of DL symbols 310 will either remain the same as the symbol before it or decrease. While not shown in FIG. 3, another scenario may include where one of the first two symbols (TX0 or TX1) allocated for PDCCH has a higher number of CORESETs to transmit than DL RBs in any of the symbols allocated for PDSCH, in which case the corresponding PDCCH symbol would be the designated symbol.

Based on this downlink data block allocation scheme, the baseband may only need to send parameters indicating symbol position and the number of blocks of downlink data (CORESETs or DL RBs) in the symbol with the maximum number of downlink data blocks. In this example, referring to FIG. 3, this would correspond to symbol 3 (i.e., TX2) with DL RBs shown by 312. This ensures that the symbol-based APT circuit scheme discussed herein can count on the number of blocks of downlink data, and required bias level, to decrease in time during the TX portion of the slot. A TX circuit that takes advantage of this scheme is shown and discussed later in ensuing figures.

A voltage profile 320 corresponding to the downlink data block allocation scheme illustrates the PA bias voltages applied across Slot 1 302. As illustrated, the voltage profile 320 includes a plurality of bias voltages 322-326. In this example, three bias voltages are shown, but it is appreciated that quantities of bias voltages may be implemented based on the specific device and/or circuit configuration. The voltage profile that corresponds to the downlink data block allocation scheme remains flat or monotonically decreases across Slot 1 starting at the designated symbol (i.e., TX2 in this case). In this sense, a symbol-based APT scheme is implemented starting at the designated symbol. While there may lost power saving opportunity with respect to the first two symbols (i.e., TX0 ad TX1) since the bias voltage is at the level indicated by 322 (corresponding to the bias voltage needed for TX2 312), the symbol-based APT provides ample power savings starting at the designated symbol through the rest of the DL symbols of the slot.

Once the DL symbols have been transmitted, the PA bias voltage may return to the maximum PA voltage in anticipation of the next slot (Slot 2 304) as shown in FIG. 3, or it may return to the PA voltage level 322 (not shown), for example.

Figure 4:
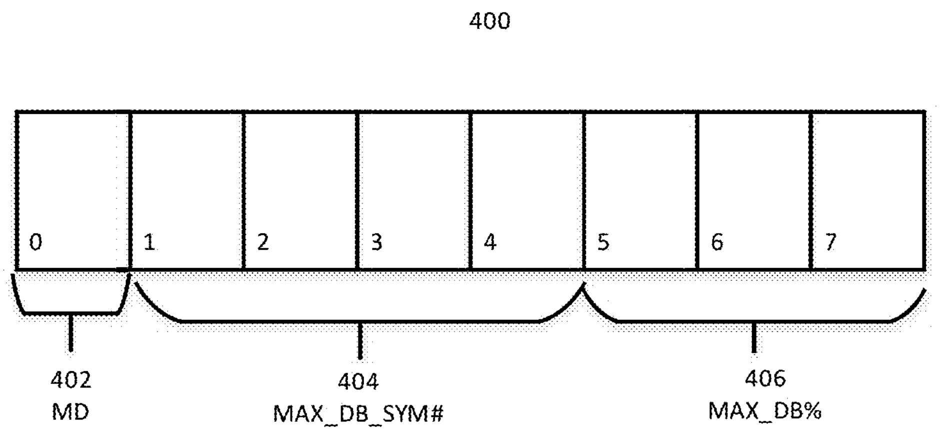
FIG. 4 exemplarily shows a downlink data descriptor in accordance with various aspects.

FIG. 4 illustrates an example of a downlink data descriptor 400 (also referred to as an RB profile descriptor) according to some aspects. It is appreciated that FIG. 4 is exemplary in nature and may thus be simplified for purposes of this explanation.

As shown in FIG. 4, downlink data descriptor 400 may be a one-byte compact descriptor with a plurality of fields, 402-406. The downlink data descriptor 400 shown in FIG. 4 conveys the minimum information needed for PA configuration firmware to know (a) if the upcoming slot has a downlink data block allocation scheme that remains constant or monotonically decreases across the symbols in the slot, (b) the symbol position for a designated symbol at which the monotonic decreasing or constant downlink data block allocation scheme begins, and (c) how many blocks of downlink data (e.g., either CORESETs for PDCCH or DL RBs for PDSCH) are in the designated symbol with the highest % of blocks of downlink data compared with a maximum amount possible. The downlink data descriptor 400 may be generated by upper levels of a baseband processing unit and communicated to a PA circuit in a transmission chain.

The first field 402 indicates whether the upcoming slot downlink data block allocation scheme is monotonically decreasing (MD) and may include an MD flag in the form of a True/False variable. If True, then then upcoming downlink data block allocation scheme is guaranteed to be flat or monotonically decreasing starting at a designated symbol. For example, field 402 may include one bit of a Boolean bit type where a "1" value indicates that the slot has a downlink data block allocation scheme with a number of blocks of downlink data that remain constant or monotonically decrease starting at a designated symbol of the plurality of symbols allocated for downlink data.

The second field 404 provides the symbol position of the designated symbol (MAX_DB_SYM #) where the flat or monotonically decreasing profile of the downlink data blocks begins. For example, this may be a first symbol allocated for PDSCH (based on the number of DL RBs to be transmitted), but it may also be the first symbol allocated for PDCCH (based on the number of CORESETs to be transmitted). The second field 404 may be, for example, a four-bit field with bits of an Integer bit type that provide the symbol position of the designated symbol in a slot (e.g., with respect to FIG. 3, this would be the third symbol, i.e., TX2).

The third field 406 indicates the number of blocks of downlink data (e.g., either CORESETs for PDCCH or DL RBs for PDSCH) in the symbol position of the designated symbol indicated in the second field 404. This may be provided in the form of a ratio of the quantity of blocks of downlink data compared with a maximum number of blocks. In other words, the third field 406 provides a maximum downlink data block percentage (MAX_DB %) that gives the number of downlink data blocks in the designated symbol based on the 0% to 100% scale shown in FIG. 3, for example, where 100% indicates that the maximum amount of either CORESETs or DL RBs are to be transmitted in the given symbol. Referring to FIG. 3, the third field would provide a quantity corresponding to 312. In a more general form, the MAX_DB % may represent the actual symbol power expressed as a percentage of the maximum allowable power per symbol. This would be applicable in systems where a symbol may include both user data and control information.

The third field 406 may include a plurality of bits of an Integer bit type that provides the number of data blocks contained in the designated symbol (compared with the maximum amount) in different gradations, where the granularity of the gradations is based on the quantity of the plurality of bits in the third field. For example, if the plurality of bits is 3 bits, then the gradations may be in 12.5% increments, where 100% means the maximum number of CORESETs (for PDCCH) or DL RBs (for PDCCH) in the designated symbol. A value of “011” in the third field indicates that the symbol specified uses no more than (3*12.5%+12.5%)=50% of the maximum DL data blocks available for the RF bandwidth use. For example, for an FR2 MHz component carrier and 120 kHz SCS, there may be a maximum of 264 DL data blocks available.

It is appreciated that FIG. 4 is an example for a downlink data descriptor that provides the minimum amount of information needed to implement features of the present disclosure. In some aspects, the fields may include other numbers of bits, and the data descriptor may be larger than one byte.

Figure 5:
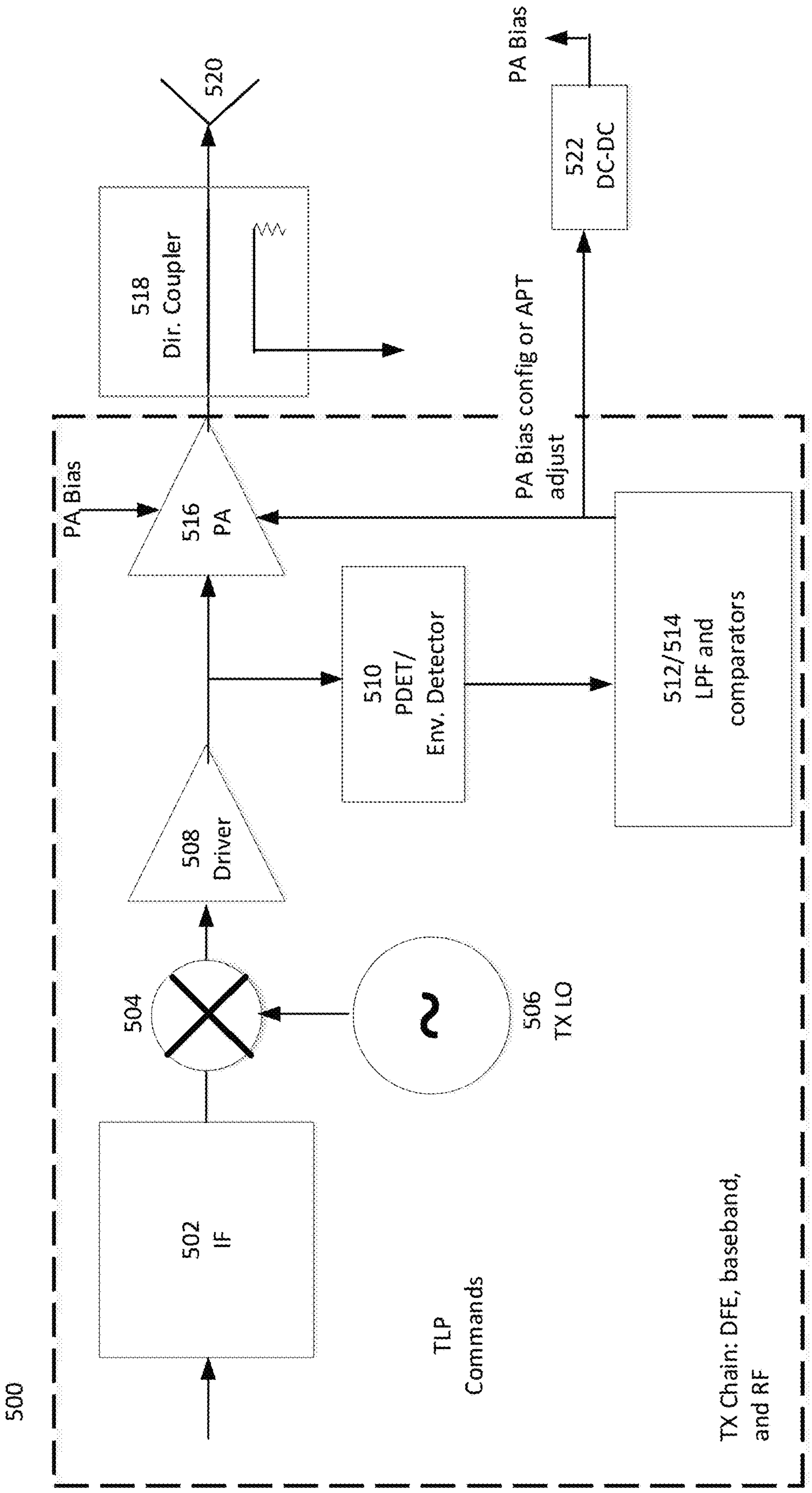
FIG. 5 exemplarily shows a power amplifier (PA) circuit implementation with autonomous bias voltage control in accordance with various aspects.

FIG. 5 illustrates an example diagram of a PA circuit implementation 500 with autonomous bias control according to some aspects. It is appreciated that PA circuit diagram 500 is exemplary in nature and may be simplified for purposes of this explanation. One or more of the components shown in FIG. 5 (and similarly in FIG. 6) may collectively be referred to as being a processor, one or more processors, processing circuitry, or the like.

PA circuit implementation 500 may include intermediate frequency (IF) circuit 502 for IF amplifying and/or filtering, a mixer 504 to mix the output of IF circuit 502 with a signal provided by a TX local oscillator (LO) 506, and a driver circuit 508. PA circuit implementation 500 may further include a Power detector (PDET) or envelope detector (Env. Detector) 510, low-pass filters and comparators 512/514, and the PA 516. Elements 502-516 may be included in a transmission (TX) chain including digital front-end (DFE), baseband, and RF components of a device such as a base station. Furthermore, PA circuit implementation 500 may include a directional coupler (Dir. Coupler) 518 between the PA 516 and an antenna 520. PA circuit implementation 500 may further include a DC-DC Converter 522. The PDET/Env. Detector 510 and LPF and comparators 512/514 include the processing components and/or processing circuitry to implement the symbol-based APT methods described in this disclosure.

In PA circuit implementation 500, PDET/Env. Detector 510 tracks the signal envelope in real-time, and a LPF in 512 generates an averaged envelope value. The goal is to average over 50-100% of a symbol, so the time constant of the LPF would be in the range of 0.5-1.5*Tsym, where Tsym is the symbol time. Once the averaged envelope drops enough to allow a new bias voltage setting to be used, comparators 514 will produce output signals that trigger a PA bias change (e.g., either lower DC-DC bias, or change of PA bias current or gate voltage). While this approach incurs a somewhat “delayed reaction” due to the LPF, there is no risk of EVM clip, due to the guaranteed monotonic flat/decreasing RB profile. If the APT control variable is the DC-DC supply voltage, it should always be faster to lower it than to raise it, because the existing load current helps drag charge off the output caps. If the APT control variable is the gate bias voltage, or a PA bias current, then changing these may be performed faster.

Figure 6:
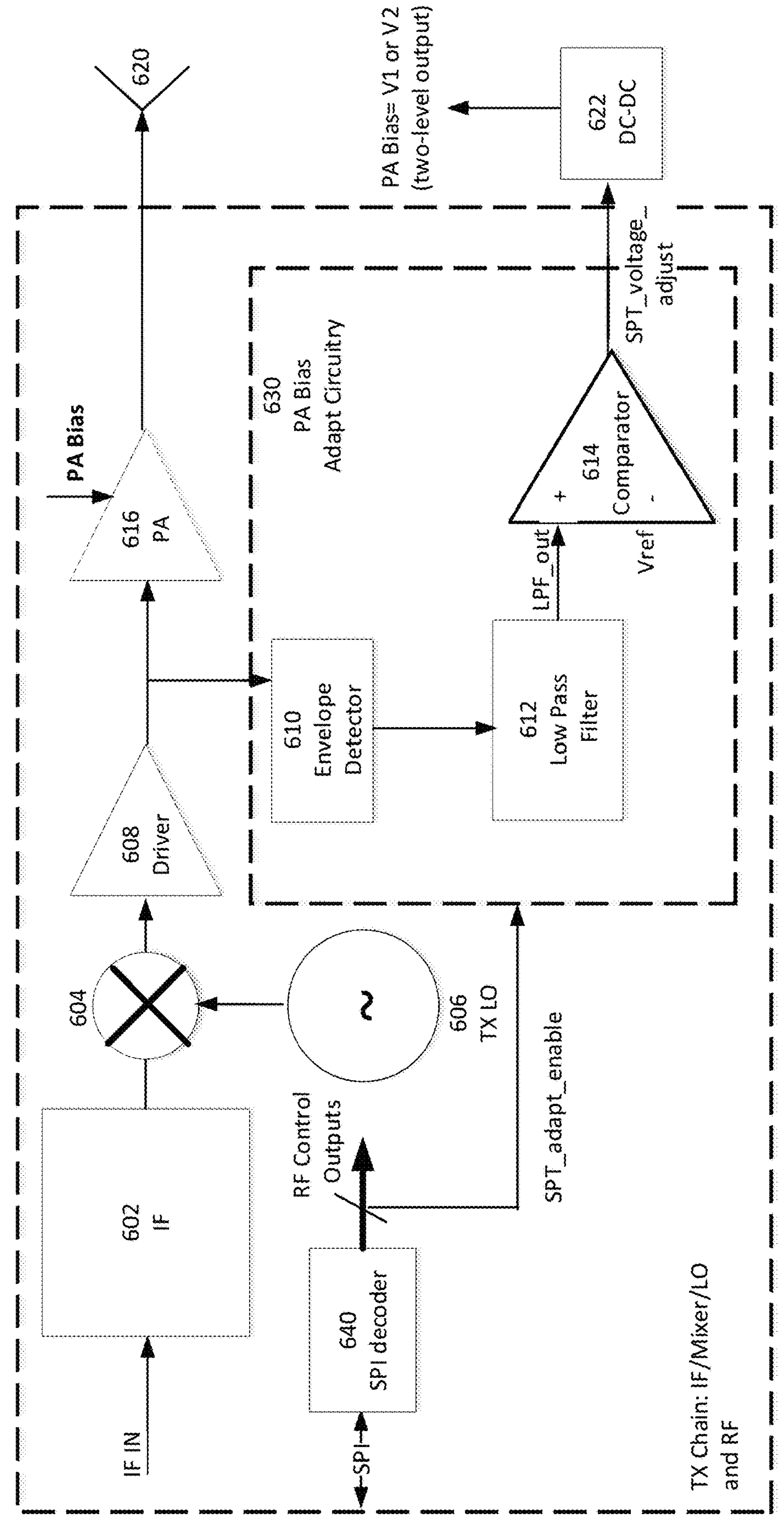
FIG. 6 exemplarily shows a PA circuit implementation with two-level PA bias voltage control in accordance with various aspects.

FIG. 6 is an example of a diagram of PA circuit implementation 600 illustrating aspects (in conjunction with FIG. 7) according to the present disclosure. PA circuit diagram 600 provides an implementation illustrating application of two levels of PA bias voltage to a PA. It is appreciated that this is done for purposes of simplifying the explanation and that it may be scalable to other amounts, e.g., implementations including three or more PA bias voltages with the use of additional comparators.

PA circuit implementation 600 may include similar components as discussed with respect to FIG. 5, and thus a detailed explanation of all the components is not fully repeated. PA Bias Adapt Circuitry 630 shows the novel functional elements that implement the features of the present disclosure and includes an Envelope Detector 610, a Low-Pass Filter 612, and a Comparator 614. DC-DC converter 622 with variable output may also be utilized to implement the features described herein. The PA Bias Adapt Circuitry 630, in conjunction with the features of the constant or monotonically decreasing data block profile starting at a designated symbol (e.g., in FIG. 3 or in FIG. 7), are able to realize the symbol-based APT and PA bias voltage methods described herein.

Envelope Detector 610 tracks the RF signal envelope in real-time. For this example, the features may correspond to NR FR2 with 120 kHz SCS and 8.9 μs symbol times (Tsym).

The Low-Pass Filter (LPF) 612 is configured to have a time constant consistent with the symbol time, such that a reliable estimate of the number of downlink data blocks (e.g., either CORESETs or DL RBs) is provided by the LPF output (LPF_out). Since a typical LTE or NR orthogonal frequency-division multiplexing (OFDM) has significant peak/average variation, it is critical that the envelope be averaged long enough such that a true estimate of the average power, and thus the number of downlink data blocks, is obtained. This averaging period may be at least one half of a symbol, if not more, where a longer averaging interval implies some filter delay. Thus, LPF_out will reflect a slightly delayed reaction to the downlink data block variation per symbol. In some aspects, this nominal delay may be ideally restricted to no more than one symbol. For example, with Tsym=8.9 μs and a targeted rise time of 0.75*Tsym, then an ideal LPF bandwidth may be approximately 52 kHz using Rise time*Bandwidth=0.35 as a filter formula.

The lag in LPF_out is not a problem given that the assumption of a constant or monotonically decreasing data black profile for a given symbol, and this lag may just signify that the PA is temporarily biased higher than it needs to be. When LPF_out falls below the comparator 614 negative input, Vref, the output (SPT_voltage_adjust, where SPT is Symbol Power Tracking) will change state such that the DC-DC 622 will switch its output to a lower output (e.g., change from V1 to V2). This lower output will be sufficient to bias the PA for the number of blocks of downlink data (e.g., DL RBs) corresponding to the LPF-out level that caused comparator 614 to flip state. In this example, in conjunction with FIG. 7, the Vref comparator input corresponds to the number of downlink data blocks (e.g., DL RBs in PDSCH) being at 50% of the maximum level. This 50% of the maximum level may correspond to a pre-defined threshold, for example.

It is important to note how the feature of the constant or monotonically decreasing RB profile (i.e., downlink data block allocation scheme) plays a key role in the implementation. The downlink data descriptor (e.g., similar to that shown in FIG. 4) is provided to SPI decoder 640 via a Serial Peripheral Interface (SPI) with baseband processing circuitry (not shown in FIG. 6). The SPI decoder 640, based on the first field indicating that the slot has a constant or monotonically decreasing data block profile beginning at a designated symbol, provides a SPT_adapt_enable signal to PA Bias Circuitry 630, allowing for the activation of the features described with respect to the Envelope Detector 610, LPF 612, and Comparator 614. If the data block profile is not configured in a manner that is constant or monotonically decreasing, then the number of data blocks (e.g., DL RBs in PDSCH) for a symbol N may be larger than its preceding symbol (Symbol N−1) such that the comparator would need to change the DC-DC back to a higher voltage (e.g., from V2 to V1) on a symbol-to-symbol basis. If this were the case, the LPF lag would cause an EVM clip event due to insufficient PA bias voltage for a symbol or more. Although SPI is provided as an exemplary control protocol for purposes of this explanation, it is appreciated that other control protocols such as MIPI RFFE or the like can be used in place of SPI.

Figure 7:
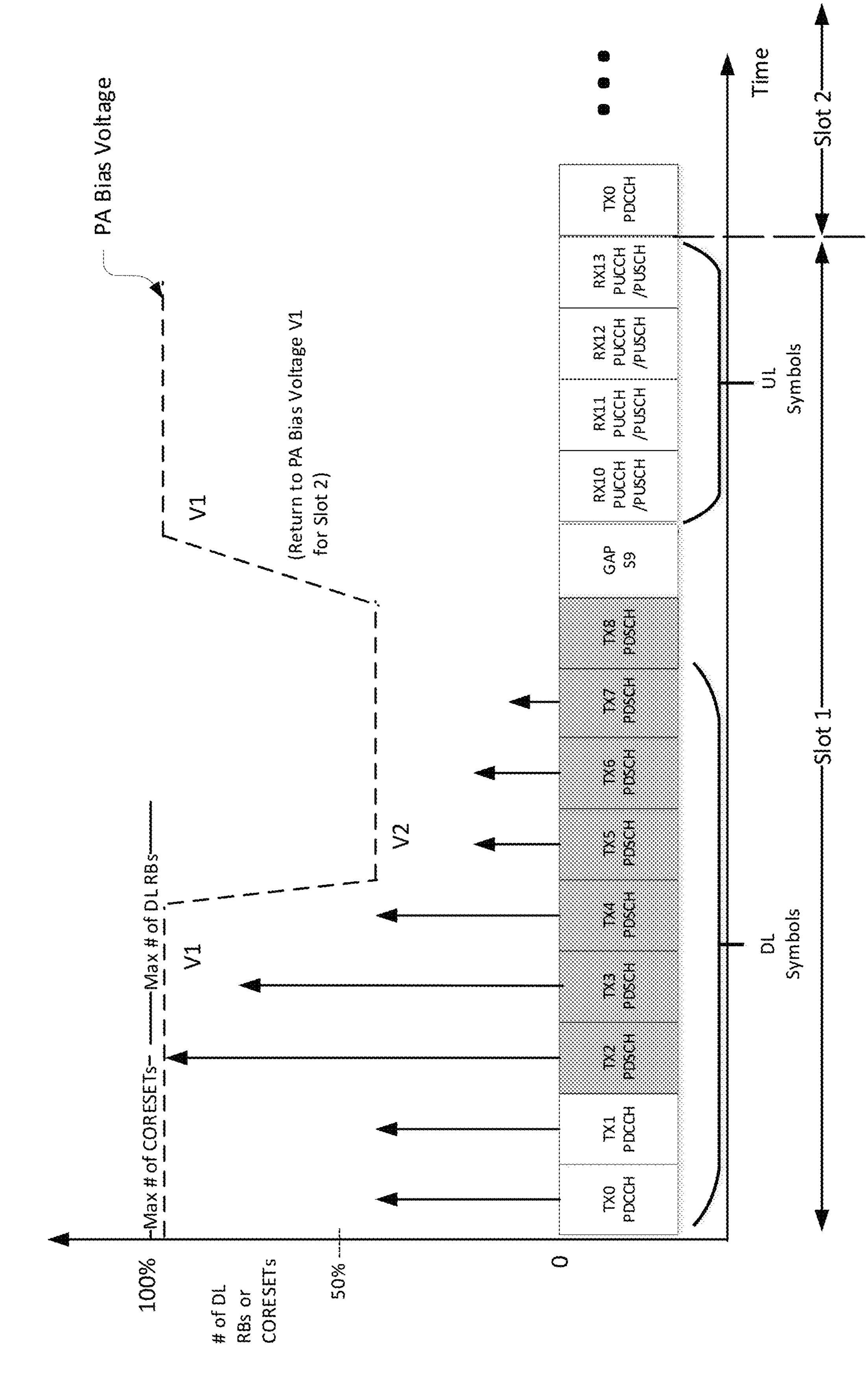
FIG. 7 exemplarily shows a downlink data block allocation diagram corresponding to FIG. 6 in accordance with various aspects.

FIG. 7 illustrates a downlink data block allocation scheme corresponding to the PA circuit implementation shown in FIG. 6. The two voltage biases shown from FIG. 6 are illustrated as V1 and V2 in FIG. 7. For Slot 1 illustrated in FIG. 7, the downlink data descriptor (e.g., as shown in FIG. 4) would have the following bit field settings: first field=1 (True) (i.e., indicating Slot 1 has a downlink data block allocation scheme that remains constant or decreases monotonically starting at a designated symbol), second field=2 (indicating that symbol 2 (i.e., the third symbol since symbol numbering starts at 0) is the designated symbol), and third field=100% (indicating that the designated symbol has the maximum amount of data blocks). These field settings indicate that the downlink data block allocation scheme for Slot 1 complies with the constant/monotonically decreasing data block profile starting with symbol 2, and the number of downlink data blocks in symbol 2 is between 87.5% and 100% of the maximum amount of downlink data blocks (in this case, DL RBs) available for the bandwidth in use. Also, in this implementation, Vref comparator input corresponds to the number of downlink data blocks (e.g., DL RBs in PDSCH) being at 50% of the maximum level. Accordingly, the PA bias voltage is reduced from V1 to V2 when the percentage of downlink data blocks falls at or beneath 50%.

The behavior during Slot 1 in FIG. 7 (as implemented by PA circuit implementation 600 in FIG. 6) may be described as follows.

First, the downlink data descriptor (e.g., as shown in FIG. 4) is received by SPI decoder 640 before Slot 1 begins. The logic would be applied as: if the first field bit is “0” (False), then the PA bias is left at V1, and SPT_adapt_enable is kept at “0”, or, if the first field bit is “1” (True), then set SPT_adapt_enable=1 at the beginning of the symbol number indicated by the second field. In this example, this would be symbol 2.

This allows the dynamic adaptation of the PA bias to commence at symbol 2. In the slot shown in FIG. 7, at some point after symbol 5 (TX4 in FIG. 7) begins, Envelope detector 610 would detect that the number of downlink data blocks in symbol 4 is less than 50% of the maximum amount allowed. This LPF_out would cause the comparator 614 to flip the state from PA bias voltage V1 to V2. The 50% value is an example of a pre-defined threshold as used in the present disclosure. It is appreciated that other values, and a number of different values, may be used. For example, additional comparators may be provided, wherein each of the comparators is configured to flip the state of the PA bias voltage based on a different unique pre-defined threshold given to it.

Next, the DC-DC 622 would change its output to V2, with a finite ramp-down transition time. Various circuit techniques to accelerate this ramp-down time may be utilized.

Therefore, TX symbols 5-8 shown in FIG. 7 would use PA bias voltage V2, and thus have a lower power consumption than if V1 were used.

After the final TX symbol is sent (i.e., TX8 in FIG. 7), the PA bias voltage would be returned to V1 based on the assumption that the next slot (slot 2) requires it. In some aspects, additional signaling from the baseband levels may be received that indicate that all the symbols in the upcoming slot are less than 50% full of downlink data blocks, and V2 may be left enabled.

The procedure may then repeat again for the next slot (Slot 2 in FIG. 7).

Figure 8:
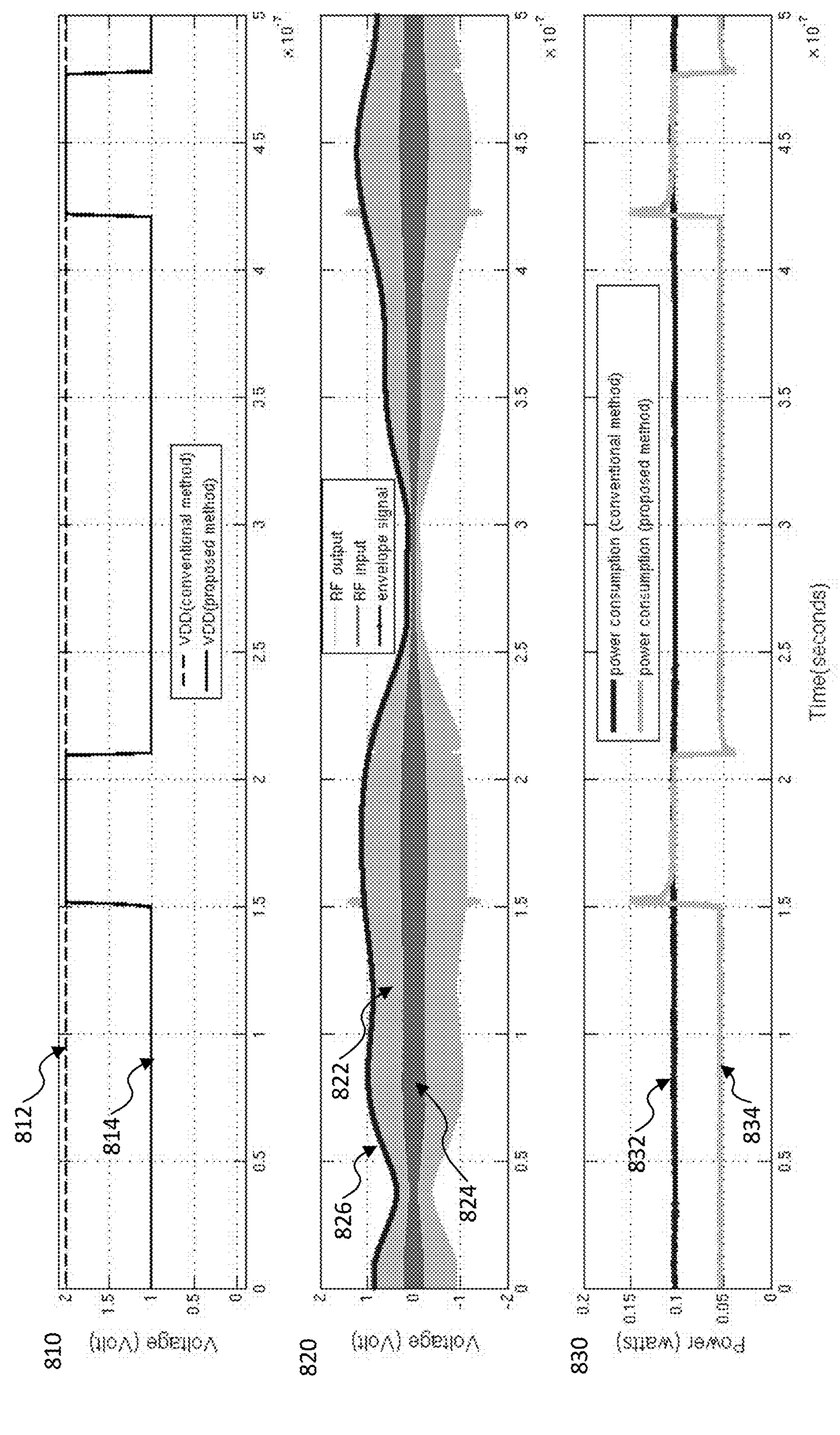
FIG. 8 exemplarily shows a series of graphs with results of the schemes and devices in accordance with various aspects of the disclosure compared with a conventional approach with a fixed bias voltage.

FIG. 8 shows several graphs 810, 820, and 830 illustrating results of the features of the present disclosure compared with the conventional approach. The proposed method’s results show the dynamic switching of the DC-DC power supply, with the resulting 40% power savings realized when the DC-DC output is lowered compared with that of the conventional approach of maintaining a fixed PA bias voltage.

Graph 810 illustrates the difference in drain power voltage (VDD) of the proposed method 814 of this disclosure compared with the conventional method 812 of a fixed bias voltage. As shown in graph 810, the conventional method 812 applies a fixed VDD at 2 Volts while the method proposed herein 814 switches between 1 Volt and 2 Volts (e.g., corresponding to V1 and V2 as described with respect to FIGS. 6-7).

Graph 820 illustrates the RF output (light gray) 822, RF output (darker gray) 824, and the envelope signal 822.

Graph 830 shows the power consumption of the conventional method 832 compared with that of the proposed method 834 of this disclosure. As shown in graph 830, the proposed method 834 provides increased power savings compared with that of the conventional method 832 with a fixed bias voltage.

Further enhancements to the methods and devices of the present disclosure are provided below.

A first enhancement may enable the baseband modem to provide the PA circuit implementation with a downlink data block allocation scheme that includes a per-symbol data block profile (e.g., CORESETs or DL RBs). The power supply may thus be changes per symbol (or symbol pair) based on this profile.

Another enhancement includes utilizing predictive behavior based on recent traffic patterns. For example, the downlink data block allocation scheme may reflect low downlink data blocks in each of the symbols during a period in which user traffic is relatively low (e.g., late at night to early morning).

Another enhancement includes a PA circuit implementation in which a dummy PA is engaged during the DC-DC voltage transition, using a second DC-DC.

Another enhancement includes using an APT tracker scheme to enhance the voltage transition.

Another enhancement includes using N (where N is an integer number) discrete DC-DCs having different output voltages and switching the PA bias to the various outputs as determined by the downlink data block allocation scheme (i.e., RB profile).

Another enhancement includes, for trackers and/or DC-DCs with a limited number of predefined voltage levels, scheduling the number of downlink data blocks (e.g., CORESETs or DL RBs) in a way that the number of downlink data blocks per symbol is well-aligned to the discrete voltage levels to optimize the average voltage and therefore, the average power profile across a slot. In other words, instead of the base station scheduler having a downlink data block allocation scheme as follows:

Symbol0-100 RBs→3V
Symbol1-80 RBs→3V
Symbol2-70 RBs→3V
Symbol3-50 RBs→2V
Symbol4-40 RBs→2V
Symbol5-40 RBs→2V, the downlink data block allocation scheme could instead be scheduled as:

Symbol0-100 RBs→3V
Symbol1-100 RBs→3V
Symbol2-60 RBs→2V
Symbol3-60 RBs→2V
Symbol4-30 RBs→1V
Symbol5-30 RBs→1V.

The difference between the first and second downlink data block allocation schemes shown above is that the first data block allocation scheme has an average supply voltage of 2.5V for the 380 RBs, while the second data block allocation scheme has an average supply voltage of 2V for the same number of RBs. Such scheduling would also be dependent on the quantity of bias voltages able to be applied to the PA.

The benefits of the methods and devices provided by the present disclosure include, but are not limited to, the following. First, after the designated symbol, the PA bias voltage can remain constant or decrease across the rest of a slot. In other words, it will never have to be raised during the transmission of the downlink symbols in the slot. In practice, this simplifies the PA bias voltage symbol-based APT implementation as it is always faster to drag charge off the DC-DC output capacitors than it is to increase it. Second, the schemes provided herein are more delay-tolerant, as a half-symbol delay for the APT voltage ramp-down indicates that the PA power consumption will be slightly higher than the ideal (and significantly more difficult to implement) APT with instantaneous voltage change response. Third, the PA bias voltage control can be autonomous using the LPF/comparator scheme shown herein, or the PA bias voltage transitions can be implemented based on baseband programming commands. Fourth, varying the PA bias voltage reduces the PA power consumption by a percentage related to the PA voltage reduction percentage. For example, if the number of downlink data blocks is 50% of the maximum RB allocation allowable based on the bandwidth, the PA voltage can be reduced by a factor of 0.707, about a 29% power consumption reduction.

Figure 9:
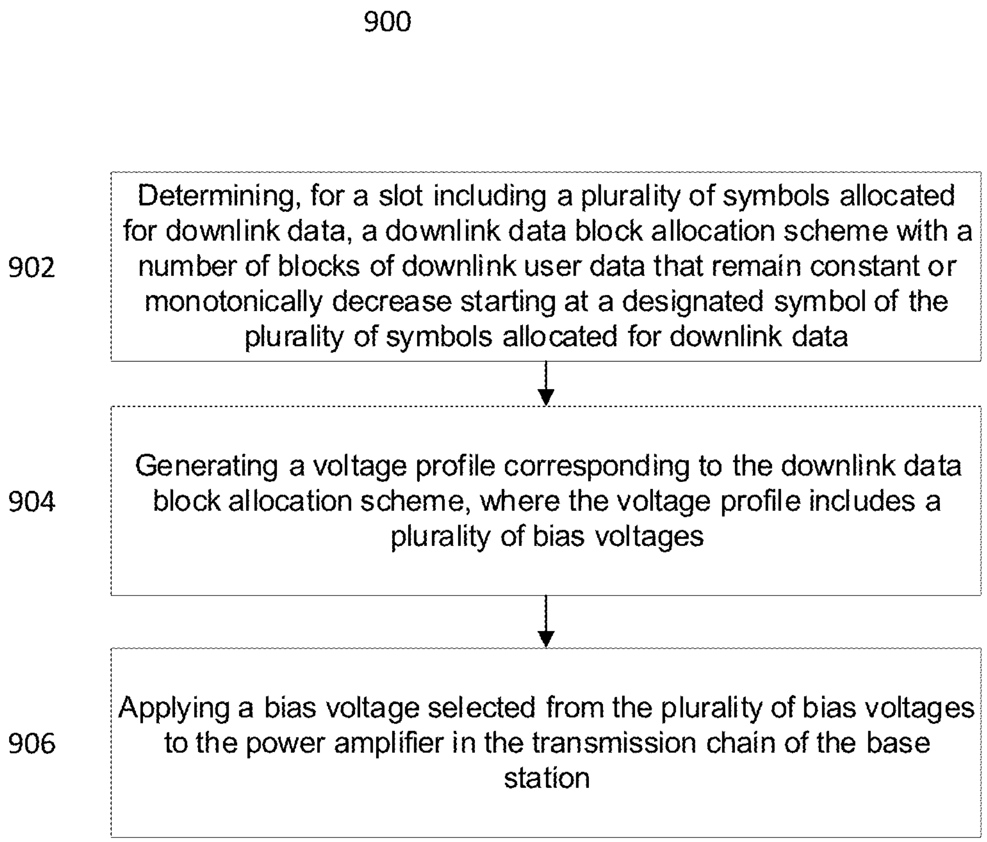
FIG. 9 exemplarily shows a flowchart describing a method in accordance with various aspects.

FIG. 9 is a process flowchart 900 illustrating a method for implementing the schemes described according to some aspects. It is appreciated that flowchart 900 is exemplary in nature and may be combined with further details or features of the present disclosure.

Flowchart 900 shows a method for a base station to apply bias voltages to a power amplifier in a transmission chain of the base station. The method may include determining, for a slot including a plurality of symbols allocated for downlink data, a downlink data block allocation scheme with a number of blocks of downlink data that remain constant or monotonically decrease starting at a designated symbol of the plurality of symbols allocated for downlink data 902; generating a voltage profile corresponding to the downlink data block allocation scheme, where the voltage profile includes a plurality of bias voltages 904; and applying a bias voltage selected from the plurality of bias voltages to the power amplifier in the transmission chain of the base station 906. The generation of the voltage profile in 902 may correspond to which of the plurality of bias voltages will be applied based on the detected data block load in the symbols. For example, with respect to FIG. 7, the voltage profile includes applying voltage V1 when the detected data block load in the symbols is above 50% of the maximum amount of data blocks allowable and voltage V2 when the detected data block load in the symbols is below 50% of the maximum amount of data blocks allowable. Similarly, other voltage profiles with more than two voltages may be implemented, e.g., as shown in FIG. 3.

Figure 10:
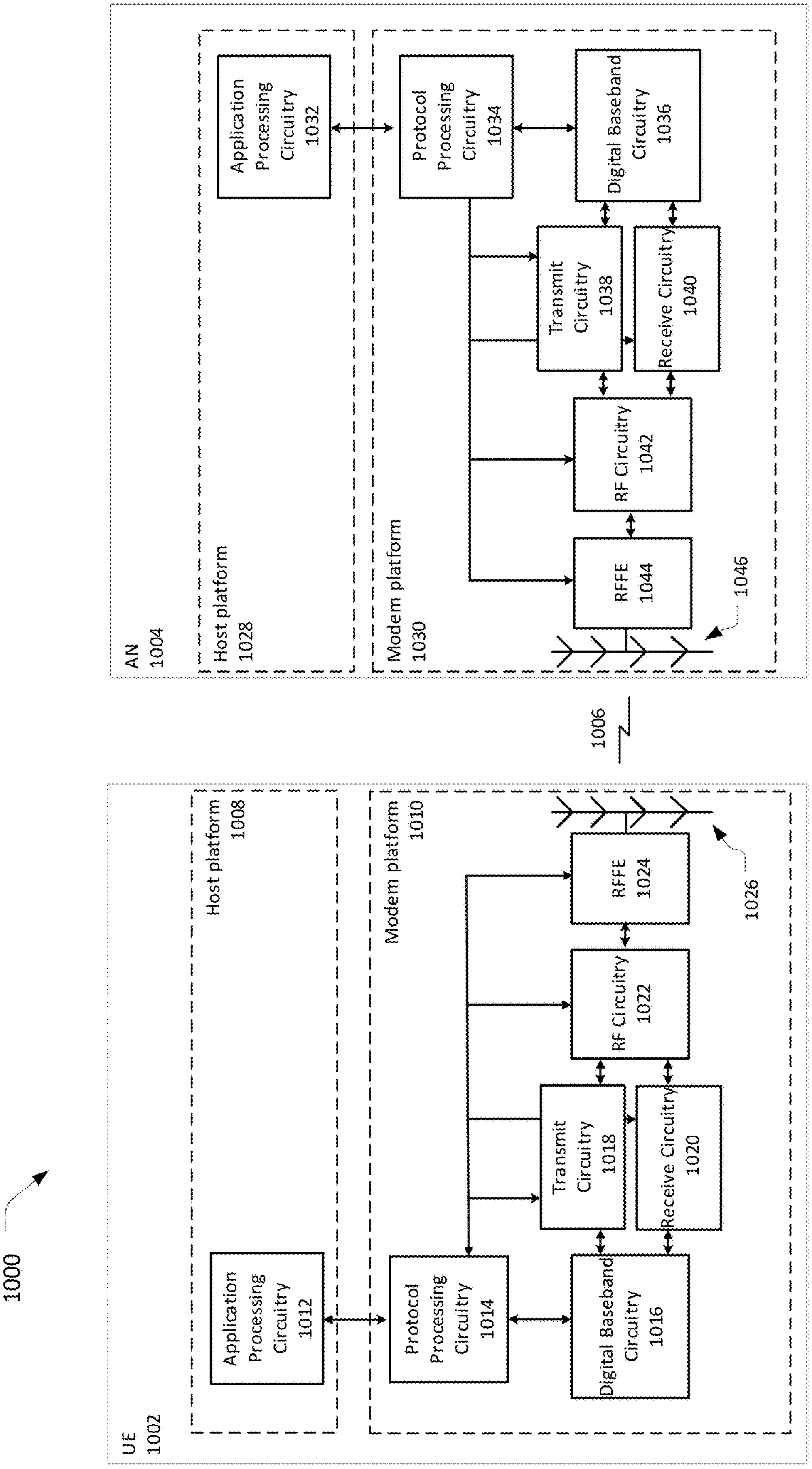
FIG. 10 exemplarily illustrates a schematic diagram of a wireless network in accordance with various aspects.

FIG. 10 schematically illustrates a wireless network 1000 in accordance with various aspects. The wireless network 1000 may include a UE 1002 in wireless communication with an access node (AN) 1004. The AN 1004 may be referred to as a base station (BS), Next Generation NodeB (gNB), RAN node, evolved NodeB (eNB), next generation eNB (ng-eNB), NodeB, Roadside Unit (RSU), Wireless Local Area Network (WLAN) Access Point (AP), etc. The AN 1004 may be a macrocell base station or a low power base station for providing femtocells, picocells or other like cells having smaller coverage areas, smaller user capacity, or higher bandwidth compared to macrocells.

The UE 1002 and AN 1004 may be similar to, and substantially interchangeable with, like-named components described elsewhere herein.

The UE 1002 may be communicatively coupled with the AN 1004 via connection 1006. The connection 1006 is illustrated as an air interface to enable communicative coupling and can be consistent with cellular communications protocols such as a 5G NR protocol operating at mmWave or sub-6 GHz frequencies.

The UE 1002 may include a host platform 1008 coupled with a modem platform 1010. The host platform 1008 may include application processing circuitry 1012, which may be coupled with protocol processing circuitry 1014 of the modem platform 1010. The application processing circuitry 1012 may run various applications for the UE 1002 that source/sink application data. The application processing circuitry 1012 may further implement one or more layer operations to transmit/receive application data to/from a data network. These layer operations may include transport (for example User Datagram Protocol (UDP)) and Internet (for example, IP) operations.

The protocol processing circuitry 1014 may implement one or more of layer operations to facilitate transmission or reception of data over the connection 1006. The layer operations implemented by the protocol processing circuitry 1014 may include, for example, Medium Access Control (MAC), Radio Link Control (RLC), Packet Data Convergence Protocol (PDCP), Radio Resource Control (RRC), and Non-Access Stratum (NAS) operations.

The modem platform 1010 may further include digital baseband circuitry 1016 that may implement one or more layer operations that are "below" layer operations performed by the protocol processing circuitry 1014 in a network protocol stack. These operations may include, for example, Physical Layer (PHY) operations including one or more of Hybrid Automatic Repeat Request Acknowledgement (HARQ-ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1010 may further include transmit circuitry 1018, receive circuitry 1020, Radio Frequency (RF) circuitry 1022, and RF front end (RFFE) 1024, which may include or connect to one or more antenna panels 1026. Briefly, the transmit circuitry 1018 may include a digital-to-analog converter, mixer, intermediate frequency (IF) components, etc.; the receive circuitry 1020 may include an analog-to-digital converter, mixer, IF components, etc.; the RF circuitry 1022 may include a low-noise amplifier, a power amplifier (PA), power tracking components, etc.; RFFE 1024 may include filters (for example, surface/bulk acoustic wave filters), switches, antenna tuners, beamforming components (for example, phase-array antenna components), etc. The selection and arrangement of the components of the transmit circuitry 1018, receive circuitry 1020, RF circuitry 1022, RFFE 1024, and antenna panels 1026 (referred generically as "transmit/receive components") may be specific to details of a specific implementation such as, for example, whether communication is Time Division Multiplexing (TDM) or Frequency Division Multiplexing (FDM), in mmWave or sub-6 gHz frequencies, etc. In some aspects, the transmit/receive components may be arranged in multiple parallel transmit/receive chains, may be disposed in the same or different chips/modules, etc.

The protocol processing circuitry 1014 may include one or more instances of control circuitry (not shown) to provide control functions for the transmit/receive components.

A UE reception may be established by and via the antenna panels 1026, RFFE 1024, RF circuitry 1022, receive circuitry 1020, digital baseband circuitry 1016, and protocol processing circuitry 1014. In some aspects, the antenna panels 1026 may receive a transmission from the AN 1004 by receive-beamforming signals received by a plurality of antennas/antenna elements of the one or more antenna panels 1026.

A UE transmission may be established by and via the protocol processing circuitry 1014, digital baseband circuitry 1016, transmit circuitry 1018, RF circuitry 1022, RFFE 1024, and antenna panels 1026. In some aspects, the transmit components of the UE 1002 may apply a spatial filter to the data to be transmitted to form a transmit beam emitted by the antenna elements of the antenna panels 1026.

Similar to the UE 1002, the AN 1004 may include a host platform 1028 coupled with a modem platform 1030. The host platform 1028 may include application processing circuitry 1032 coupled with protocol processing circuitry 1034 of the modem platform 1030. The modem platform may further include digital baseband circuitry 1036, transmit circuitry 1038, receive circuitry 1040, RF circuitry 1042, RFFE circuitry 1044, and antenna panels 1046. The components of the AN 1004 may be function similar to and substantially interchangeable with like-named components of the UE 1002. In addition to performing data transmission/reception as described above, the components of the AN 1004 may perform various logical functions that include, for example, Radio Network Controller (RNC) functions such as radio bearer management, uplink and downlink dynamic radio resource management, and data packet scheduling.

AN 1004 may thus provide the functionality of network access nodes in radio communication networks by providing a radio access network to enable served terminal devices to access communication data. For example, AN 1004 may also interface with a core network, one or more other network access nodes, or various other data networks and servers via a wired or wireless backhaul interface.

Figure 11:
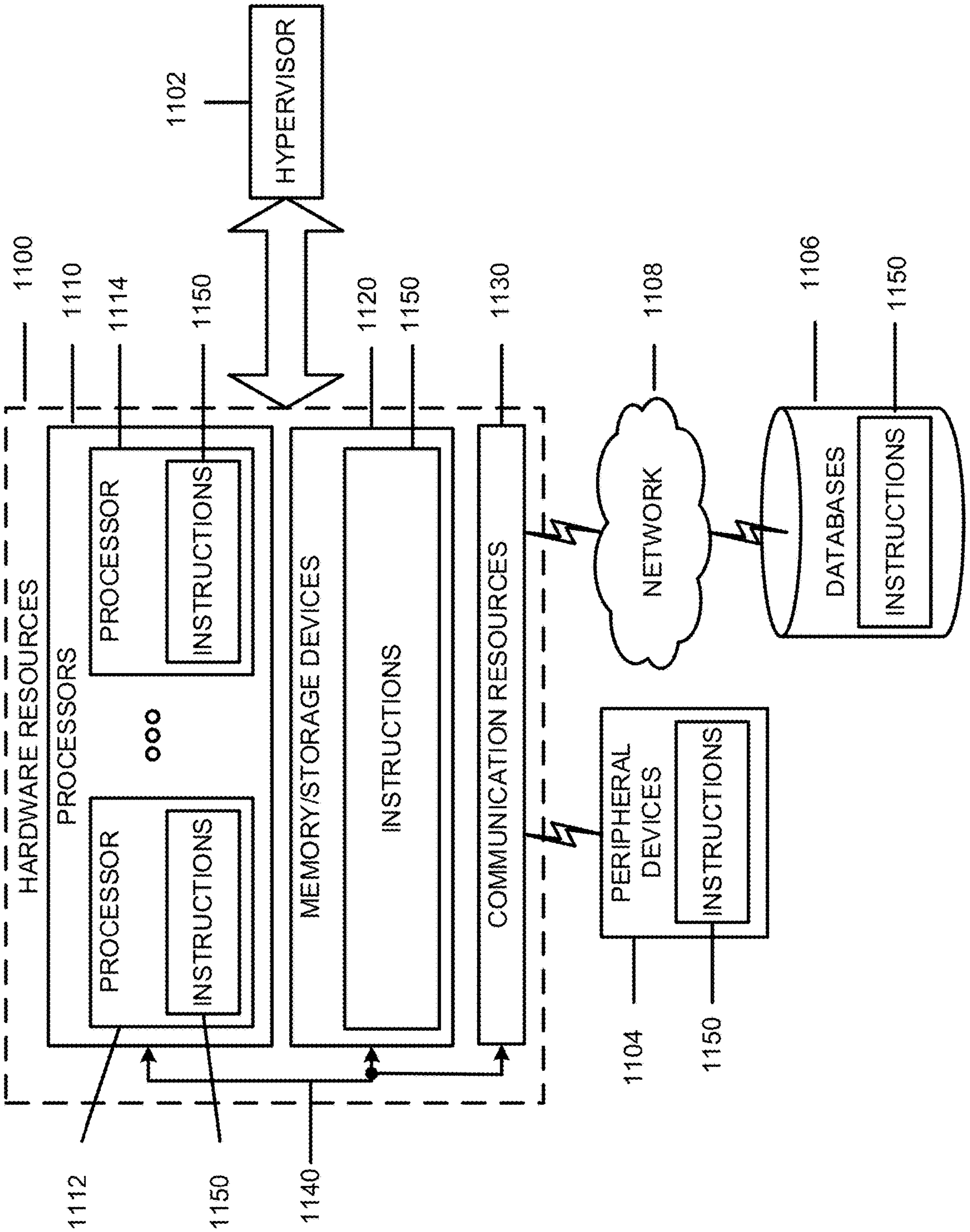
FIG. 11 exemplarily shows a block diagram illustrating components able to read instructions from a machine-readable or computer-readable medium (e.g., a non-transitory machine-readable storage medium) and perform any one or more of the methodologies in accordance with various aspects.

FIG. 11 is an exemplary block diagram illustrating components, according to some example aspects, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For aspects where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processors 1110 may be, for example, a central processing unit (CPU), a reduced instruction set computing (RISC) processor, a complex instruction set computing (CISC) processor, a graphics processing unit (GPU), a digital signal processor (DSP) such as a baseband processor, an Application Specific Integrated Circuit (ASIC), a field programmable gate array (FPGA), a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile, non-volatile, or semi-volatile memory such as dynamic random-access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via Universal Serial Bus (USB), Ethernet, etc.), cellular communication components, Near-Field Communication (NFC) components, Bluetooth® (or Bluetooth® Low Energy) components, Wi-Fi® components, and other communication components.

Instructions 1150 may include software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more aspects, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 is a communication device for a base station, the communication device including a processor configured to: determine, for a slot including a plurality of symbols allocated for downlink data, a downlink data block allocation scheme with a number of blocks of downlink data that remain constant or monotonically decrease starting at a designated symbol of the plurality of symbols allocated for downlink data; generate a voltage profile corresponding to the downlink data block allocation scheme, where the voltage profile includes a plurality of bias voltages; and apply a bias voltage selected from the plurality of bias voltages to a power amplifier in a transmission chain of the base station.

In Example 2, the subject matter of Example(s) 1 may include that the voltage profile tracks the number of blocks of downlink data in each symbol of the plurality of symbols allocated for downlink data by remaining the same or monotonically decreasing over the plurality of symbols allocated for downlink data.

In Example 3, the subject matter of Example(s) 1-2 may include that a first bias voltage of the plurality of bias voltages is greater than one or more other bias voltages of the plurality of bias voltages.

In Example 4, the subject matter of Example(s) 1-3 may include that a first symbol of the plurality of symbols allocated for downlink data has the greatest number of blocks of downlink data compared with the other symbols of the plurality of symbols allocated for downlink data.

In Example 5, the subject matter of Example(s) 1-4 may include the processor further configured to apply a constant or decreasing bias voltage to the power amplifier across the plurality of symbols allocated for downlink data.

In Example 6, the subject matter of Example(s) 1-5 may include the processor further configured to: generate a downlink data descriptor including a first field indicating that the downlink data block allocation scheme includes blocks of downlink data that remain constant or monotonically decrease starting at the designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

In Example 7, the subject matter of Example(s) 6 may include that the first field includes one bit of a Boolean bit type.

In Example 8, the subject matter of Example(s) 6-7 may include that the second field includes a second field plurality of bits of an Integer bit type.

In Example 9, the subject matter of Example(s) 8 may include that the second field plurality of bits is four bits.

In Example 10, the subject matter of Example(s) 6-9 may include that the third field includes a third field plurality of bits of an Integer bit type.

In Example 11, the subject matter of Example(s) 10 may include that the third field plurality of bits is three bits.

In Example 12, the subject matter of Example(s) 1-11 may include an envelope detector, a low-pass filter, and a comparator.

In Example 13, the subject matter of Example(s) 12 may include that the envelope detector is configured to track a signal envelope in real-time and forward the signal envelope to the low-pass filter.

In Example 14, the subject matter of Example(s) 13 may include that the low-pass filter is configured to generate an averaged envelope value to forward to the comparator.

In Example 15, the subject matter of Example(s) 14 may include that the comparator is configured to trigger a change in the plurality of bias voltages based on the averaged envelope value meeting a pre-defined threshold.

In Example 16, the subject matter of Example(s) 15 may include additional comparators configured to trigger additional changes in the plurality of bias voltages based on the averaged envelope value meeting additional pre-defined thresholds.

In Example 17, the subject matter of Example(s) 1-16 may include that the processor is configured to apply two or more of the plurality of bias voltages sequentially in decreasing order over the plurality of symbols allocated for downlink data in the slot, and, after the plurality of symbols allocated for downlink data are transmitted, return to apply a bias voltage of the plurality of bias voltages in anticipation of a second plurality of symbols in a second slot.

In Example 18, the subject matter of Example(s) 17 may include that the bias voltage of the plurality of bias voltages in anticipation of the second plurality of symbols in the second slot is the highest bias voltage of the plurality of bias voltages.

In Example 19, the subject matter of Example(s) 1-18 may include that the processor is configured to: estimate, for the downlink data block allocation scheme, a total number of blocks of downlink data to be transmitted across the plurality of symbols allocated for downlink data; and determine a schedule for the number of blocks of downlink data in each respective symbol of the plurality of symbols allocated for downlink data based on the total number of blocks of downlink data and the plurality of bias voltages of the voltage profile, where the number of blocks of downlink data in each respective symbol of the plurality of symbols allocated for downlink data is aligned to one of the plurality of bias voltages of the voltage profile such that an average bias voltage applied to the power amplifier over the plurality of symbols allocated for downlink data is minimized.

In Example 20, the subject matter of Example(s) 1-19 may include that the downlink data includes downlink control data and downlink user data.

In Example 21, the subject matter of Example(s) 20 may include that the downlink control data is provided in a Physical Downlink Control Channel (PDCCH) and the downlink user data is provided in a Physical Downlink Shared Channel (PDSCH).

In Example 22, the subject matter of Example(s) 1-21 may include that the designated symbol is the first symbol of the plurality of symbols allocated for downlink data.

In Example 23, the subject matter of Example(s) 1-21 may include that the designated symbol is a first symbol in the plurality of symbols allocated for downlink user data.

In Example 24, the subject matter of Example(s) 1-21 may include that the designated symbol is a first symbol in the plurality of symbols allocated for downlink control data.

Example 25 is a communication device for a base station, the communication device including a processor configured to: determine, for a slot including a plurality of symbols allocated for downlink data, a downlink data block allocation scheme with a number of blocks of downlink data that remain constant or monotonically decrease starting at a designated symbol of the plurality of symbols allocated for downlink user data; and generate a downlink data descriptor including a first field indicating that the downlink data block allocation scheme includes blocks of downlink data that remain constant or monotonically decrease starting at a designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

In Example 26, the subject matter of Example(s) 25 may include that the downlink user data descriptor includes eight bits.

In Example 27, the subject matter of Example(s) 25-26 may include that the first field includes one bit of a Boolean bit type.

In Example 28, the subject matter of Example(s) 25-27 may include that the second field includes a second field plurality of bits of an Integer bit type.

In Example 29, the subject matter of Example(s) 25-28 may include that the third field includes a third field plurality of bits of an Integer bit type.

Example 30 is a method for a base station to apply bias voltages to a power amplifier in a transmission chain of the base station, the method including: determining, for a slot including a plurality of symbols allocated for downlink data, a downlink data block allocation scheme with a number of blocks of downlink data that remain constant or monotonically decrease starting at a designated symbol of the plurality of symbols allocated for downlink data; generating a voltage profile corresponding to the downlink data block allocation scheme, where the voltage profile includes a plurality of bias voltages; and applying a bias voltage selected from the plurality of bias voltages to the power amplifier in the transmission chain of the base station.

In Example 31, the subject matter of Example(s) 30 may include applying two or more of the plurality of bias voltages sequentially in decreasing order over the plurality of symbols allocated for downlink data in the slot; and after the plurality of symbols allocated for downlink data are transmitted, return to apply a bias voltage of the plurality of bias voltages in anticipation of a second plurality of symbols in a second slot, where the bias voltage of the plurality of bias voltages in anticipation of the second plurality of symbols in the second slot is the highest bias voltage of the plurality of bias voltages.

In Example 32, the subject matter of Example(s) 30-31 may include that the voltage profile tracks the number of blocks of downlink data in each symbol of the plurality of symbols allocated for downlink data by remaining the same or monotonically decreasing over the plurality of symbols allocated for downlink data.

In Example 33, the subject matter of Example(s) 30-32 may include that a first bias voltage of the plurality of bias voltages is greater than one or more other bias voltages of the plurality of bias voltages.

In Example 34, the subject matter of Example(s) 30-33 may include that a first symbol of the plurality of symbols allocated for downlink data has the greatest number of blocks of downlink data compared with the other symbols of the plurality of symbols allocated for downlink data.

In Example 35, the subject matter of Example(s) 30-34 may include applying a constant or decreasing bias voltage to the power amplifier across the plurality of symbols allocated for downlink data.

In Example 36, the subject matter of Example(s) 30-35 may include generating a downlink data descriptor includes a first field indicating that the downlink data block allocation scheme includes blocks of downlink data that remain constant or monotonically decrease starting at the designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

In Example 37, the subject matter of Example(s) 36 may include that the first field includes one bit of a Boolean bit type.

In Example 38, the subject matter of Example(s) 36-37 may include that the second field includes a second field plurality of bits of an Integer bit type.

In Example 39, the subject matter of Example(s) 38 may include that the second field plurality of bits is four bits.

In Example 40, the subject matter of Example(s) 36-39 may include that the third field includes a third field plurality of bits of an Integer bit type.

In Example 41, the subject matter of Example(s) 40 may include that the third field plurality of bits is three bits.

In Example 42, the subject matter of Example(s) 30-41 may include the transmission chain including an envelope detector, a low-pass filter, and a comparator.

In Example 43, the subject matter of Example(s) 42 may include that the envelope detector is configured to track a signal envelope in real-time and forward the signal envelope to the low-pass filter.

In Example 44, the subject matter of Example(s) 43 may include that the low-pass filter is configured to generate an averaged envelope value to forward to the comparator.

In Example 45, the subject matter of Example(s) 44 may include that the comparator is configured to trigger a change in the plurality of bias voltages based on the averaged envelope value meeting a pre-defined threshold.

In Example 46, the subject matter of Example(s) 45 may include the transmission chain further including additional comparators configured to trigger additional changes in the plurality of bias voltages based on the averaged envelope value meeting additional pre-defined thresholds.

In Example 47, the subject matter of Example(s) 30 and 42-46 may include applying two or more of the plurality of bias voltages sequentially in decreasing order over the plurality of symbols allocated for downlink data in the slot, and, after the plurality of symbols allocated for downlink data are transmitted, return to apply a bias voltage of the plurality of bias voltages in anticipation of a second plurality of symbols in a second slot.

In Example 48, the subject matter of Example(s) 47 may include that the bias voltage of the plurality of bias voltages in anticipation of the second plurality of symbols in the second slot is the highest bias voltage of the plurality of bias voltages.

In Example 49, the subject matter of Example(s) 30-48 may include estimating, for the downlink data block allocation scheme, a total number of blocks of downlink data to be transmitted across the plurality of symbols allocated for downlink data; and determining a schedule for the number of blocks of downlink data in each respective symbol of the plurality of symbols allocated for downlink data based on the total number of blocks of downlink data and the plurality of bias voltages of the voltage profile, where the number of blocks of downlink data in each respective symbol of the plurality of symbols allocated for downlink data is aligned to one of the plurality of bias voltages of the voltage profile such that an average bias voltage applied to the power amplifier over the plurality of symbols allocated for downlink data is minimized.

In Example 50, the subject matter of Example(s) 30-49 may include that the downlink data includes downlink control data and downlink user data.

In Example 51, the subject matter of Example(s) 50 may include that the downlink control data is provided in a Physical Downlink Control Channel (PDCCH) and the downlink user data is provided in a Physical Downlink Shared Channel (PDSCH).

In Example 52, the subject matter of Example(s) 30-51 may include that the designated symbol is the first symbol of the plurality of symbols allocated for downlink data.

In Example 53, the subject matter of Example(s) 30-51 may include that the designated symbol is a first symbol in the plurality of symbols allocated for downlink user data.

In Example 54, the subject matter of Example(s) 30-51 may include that the designated symbol is a first symbol in the plurality of symbols allocated for downlink control data.

Example 55 is a method including: determining, for a slot including a plurality of symbols allocated for downlink data, a downlink data block allocation scheme with a number of blocks of downlink data that remain constant or monotonically decrease starting at a designated symbol of the plurality of symbols allocated for downlink user data; and generating a downlink data descriptor including a first field indicating that the downlink data block allocation scheme includes blocks of downlink data that remain constant or monotonically decrease starting at a designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

In Example 56, the subject matter of Example(s) 55 may include that the downlink user data descriptor includes eight bits.

In Example 57, the subject matter of Example(s) 55 may include that the first field includes one bit of a Boolean bit type.

In Example 58, the subject matter of Example(s) 55 may include that the second field includes a second field plurality of bits of an Integer bit type.

In Example 59, the subject matter of Example(s) 55 may include that the third field includes a third field plurality of bits of an Integer bit type.

Example 60 is one or more non-transitory readable medium including instructions that, when executed by a processor, implement a method as described in any of the preceding Examples.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which is described in further detail within this disclosure, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a non-transitory computer-readable medium in which data or information can be stored for retrieval. References to "memory"

included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

While the above descriptions and connected figures may depict device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device for a base station, the communication device comprising:

a processor configured to:

determine, for a slot comprising a plurality of symbols allocated for downlink data, a downlink data block allocation scheme with a number of blocks of downlink data that remain constant or monotonically decrease starting at a designated symbol of the plurality of symbols allocated for downlink data;

generate a voltage profile corresponding to the downlink data block allocation scheme, wherein the voltage profile comprises a plurality of bias voltages; and apply a bias voltage selected from the plurality of bias voltages to a power amplifier in a transmission chain of the base station;

wherein the processor is configured to apply two or more of the plurality of bias voltages sequentially in decreasing order over the plurality of symbols allocated for downlink data in the slot, and, after the plurality of symbols allocated for downlink data are transmitted, return to apply a bias voltage of the plurality of bias voltages in anticipation of a second plurality of symbols in a second slot.

2. The communication device of claim 1, wherein the voltage profile tracks the number of blocks of downlink data in each symbol of the plurality of symbols allocated for downlink data by remaining the same or monotonically decreasing over the plurality of symbols allocated for downlink data.

3. The communication device of claim 1, wherein a first bias voltage of the plurality of bias voltages is greater than one or more other bias voltages of the plurality of bias voltages.

4. The communication device of claim 1, wherein a first symbol of the plurality of symbols allocated for downlink data has the greatest number of blocks of downlink data compared with the other symbols of the plurality of symbols allocated for downlink data.

5. The communication device of claim 1, the processor further configured to apply a constant or decreasing bias voltage to the power amplifier across the plurality of symbols allocated for downlink data.

6. The communication device of claim 1, the processor further configured to:

generate a downlink data descriptor comprising a first field indicating that the downlink data block allocation scheme comprises blocks of downlink data that remain constant or monotonically decrease starting at the designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

7. The communication device of claim 1, comprising an envelope detector, a low-pass filter, and a comparator.

8. The communication device of claim 7, wherein the envelope detector is configured to track a signal envelope in real-time and forward the signal envelope to the low-pass filter.

9. The communication device of claim 8, wherein the low-pass filter is configured to generate an averaged envelope value to forward to the comparator.

10. The communication device of claim 9, wherein the comparator is configured to trigger a change in the plurality of bias voltages based on the averaged envelope value meeting a pre-defined threshold.

11. The communication device of claim 10, further comprising additional comparators configured to trigger additional changes in the plurality of bias voltages based on the averaged envelope value meeting additional pre-defined thresholds.

12. The communication device of claim 1, wherein the bias voltage of the plurality of bias voltages in anticipation of the second plurality of symbols in the second slot is the highest bias voltage of the plurality of bias voltages.

13. The communication device of claim 1, wherein the processor is configured to:

estimate, for the downlink data block allocation scheme, a total number of blocks of downlink data to be transmitted across the plurality of symbols allocated for downlink data; and determine a schedule for the number of blocks of downlink data in each respective symbol of the plurality of symbols allocated for downlink data based on the total number of blocks of downlink data and the plurality of bias voltages of the voltage profile, wherein the number of blocks of downlink data in each respective symbol of the plurality of symbols allocated for downlink data is aligned to one of the plurality of bias voltages of the voltage profile such that an average bias voltage applied to the power amplifier over the plurality of symbols allocated for downlink data is minimized.

14. The communication device of claim 1, wherein the downlink data comprises downlink control data and downlink user data, and wherein the downlink control data is provided in a Physical Downlink Control Channel (PDCCH) and the downlink user data is provided in a Physical Downlink Shared Channel (PDSCH).

15. The communication device of claim 1, wherein the designated symbol is a first symbol in the plurality of symbols allocated for downlink user data.

16. A communication device for a base station:

the communication device comprising a processor configured to:

determine, for a slot comprising a plurality of symbols allocated for downlink data, a downlink data block allocation scheme with a number of blocks of downlink data that remain constant or monotonically decrease starting at a designated symbol of the plurality of symbols allocated for downlink user data; and generate a downlink data descriptor comprising a first field indicating that the downlink data block allocation scheme comprises blocks of downlink data that remain constant or monotonically decrease starting at a designated symbol of the plurality of symbols allocated for downlink data, a second field indicating a symbol position of the designated symbol, and a third field indicating a ratio of a number of blocks of downlink data in the symbol position indicated in the second field compared with a maximum amount of blocks.

17. The communication device of claim 16, wherein the first field comprises one bit of a Boolean bit type, wherein the second field comprises a second field plurality of bits of an Integer bit type, and wherein the third field comprises a third field plurality of bits of an Integer bit type.

18. A method for a base station to apply bias voltages to a power amplifier in a transmission chain of the base station, the method comprising:

determining, for a slot comprising a plurality of symbols allocated for downlink data, a downlink data block allocation scheme with a number of blocks of downlink data that remain constant or monotonically decrease starting at a designated symbol of the plurality of symbols allocated for downlink data;

generating a voltage profile corresponding to the downlink data block allocation scheme, wherein the voltage profile comprises a plurality of bias voltages; and applying a bias voltage selected from the plurality of bias voltages to the power amplifier in the transmission chain of the base station;

applying two or more of the plurality of bias voltages sequentially in decreasing order over the plurality of symbols allocated for downlink data in the slot; and after the plurality of symbols allocated for downlink data are transmitted, return to apply a bias voltage of the plurality of bias voltages in anticipation of a second plurality of symbols in a second slot, wherein the bias voltage of the plurality of bias voltages in anticipation of the second plurality of symbols in the second slot is the highest bias voltage of the plurality of bias voltages.

* * * * *